United States Patent
Sato

(10) Patent No.: US 6,775,072 B2
(45) Date of Patent: Aug. 10, 2004

(54) SINGLE-FOCUS LENS

(75) Inventor: Kenichi Sato, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 125 days.

(21) Appl. No.: 10/151,973

(22) Filed: May 22, 2002

(65) Prior Publication Data

US 2003/0058546 A1 Mar. 27, 2003

(30) Foreign Application Priority Data

May 25, 2001 (JP) ........................................ 2001-156653

(51) Int. Cl.[7] .............................................. G02B 15/14
(52) U.S. Cl. ........................ 359/689; 359/708; 359/645
(58) Field of Search ................................. 359/689, 754, 359/784, 735, 776, 748, 651, 661, 716, 645, 650, 708, 771

(56) References Cited

U.S. PATENT DOCUMENTS 4,690,515 A * 9/1987 Nakajima et al. ........... 359/650
4,755,028 A * 7/1988 Moskovich ................. 359/650

FOREIGN PATENT DOCUMENTS

| JP | 9-258100 | 10/1997 |
|---|---|---|
| JP | 2000-180719 | 6/2000 |

* cited by examiner

Primary Examiner—Georgia Epps
Assistant Examiner—M. Hasan
(74) Attorney, Agent, or Firm—Snider & Associates; Ronald R. Snider

(57) ABSTRACT

A compact, inexpensive single-focus lens in a three-element configuration comprises, successively from an object side, a first lens with a low power having at least one aspheric surface, a second lens with a positive refracting power having a convex form on an image surface side, and a third lens with a low power having at least one aspheric surface.

6 Claims, 2 Drawing Sheets

EXAMPLE 1

EXAMPLE 1

EXAMPLE 2

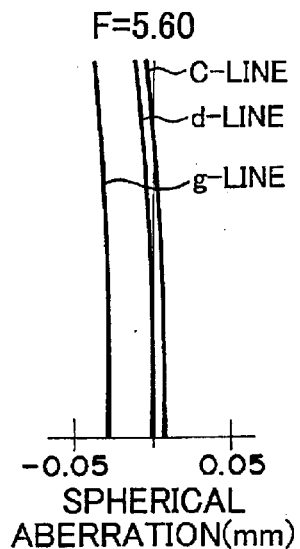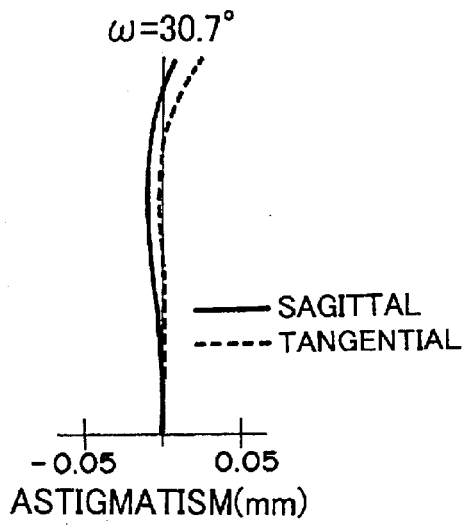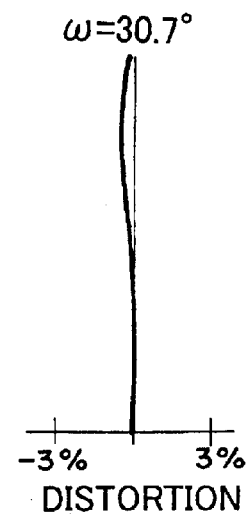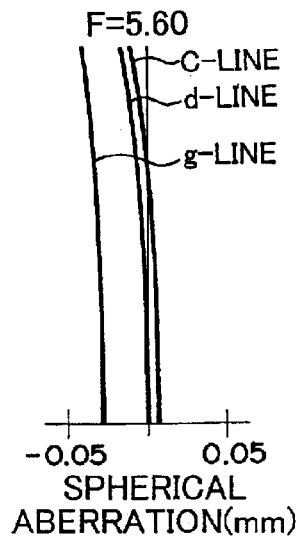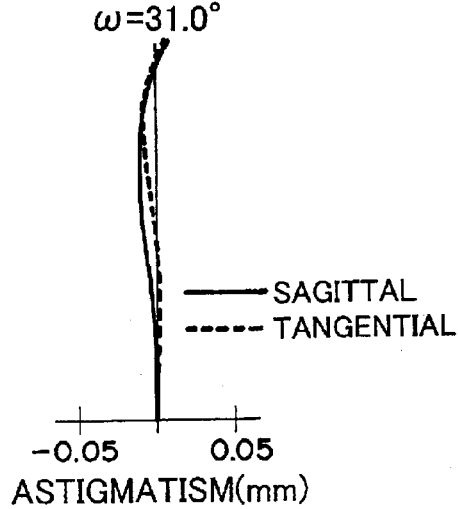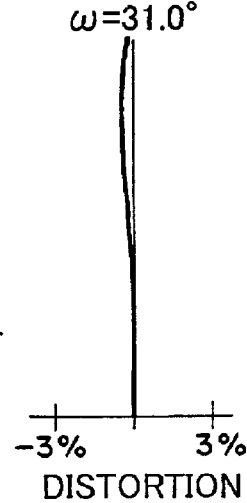

SINGLE-FOCUS LENS

RELATED APPLICATIONS

This application claims the priority of Japanese Patent Application No. 2001-156653 filed on May 25, 2001, which is incorporated herein by reference.

BACKGROUND OF THE INVENTION

1. Field of the Invention

The present invention relates to a compact single-focus lens constituted by three elements and, in particular, to a single-focus lens suitable for digital cameras.

2. Description of the Prior Art

Along with the widespread use of personal computers, digital cameras which can easily process captured image information have been becoming pervasive in recent years.

Such digital cameras are required to be more compact and less expensive, which causes an urgent demand for their taking lenses to achieve compactness and low cost.

As taking lenses for fulfilling such a demand, those disclosed in Japanese Unexamined Patent Publication No. HEI 9-258100, Japanese Unexamined Patent Publication No. 2000-180719, and the like have been known.

However, each of the taking lenses disclosed in the above-mentioned publications uses at least four lenses, and thus is demanded to achieve further compactness and lower cost.

Meanwhile, digital cameras use small-sized electric imaging devices, thereby making it necessary for principal rays to be made incident on the whole screen substantially at right angles, whereas a higher aperture efficiency and a longer back focus are required, and so forth, whereby the idea of designing their taking lens is greatly different in principle from that in conventional compact cameras using silver halide films.

SUMMARY OF THE INVENTION

In view of circumstances mentioned above, it is an object of the present invention to provide, as a taking lens mounted to a compact camera, a digital camera in particular, a single-focus lens which can achieve compactness and lower cost while favorably correcting aberrations by using a three-lens configuration.

The single-focus lens in accordance with the present invention comprises, successively from an object side, a first lens with a low power having at least one aspheric surface, a second lens with a positive refracting power having a convex form on an image surface side, and a third lens with a low power having at least one aspheric surface.

Preferably, a stop is disposed between the first and second lenses.

Preferably, the first and second lenses are formed from a plastic material.

Preferably, the single-focus lens of the present invention satisfies the following conditional expressions (1) to (3):

$$|f'/f_1'| < 0.5 \quad (1)$$

$$0.5 < f'/f_2' < 2.0 \quad (2)$$

$$|f'/f_3'| < 0.5 \quad (3)$$

where f' is the focal length of the whole lens system;
$f_1'$ is the focal length of the first lens;
$f_2'$ is the focal length of the second lens; and
$f_3'$ is the focal length of the third lens.

Preferably, the first lens has a meniscus form with a concave surface directed onto the object side.

Preferably, the single-focus lens of the present invention further satisfies the following conditional expressions (4) and (5):

$$1.65 > N_{d2} \quad (4)$$

$$50 < \nu_{d2} \quad (5)$$

where $N_{d2}$ is the refractive index of the second lens at d-line; and
$\nu_{d2}$ is the Abbe number of the second lens at d-line.

The second lens may have a substantially flat surface on the object side.

Each of the first and third lenses may have an aspheric surface on each side thereof.

BRIEF DESCRIPTION OF THE DRAWINGS

FIGS. 3A to 3C are aberration charts showing various aberrations (spherical aberration, astigmatism, and distortion) of the single-focus lens in accordance with Example 1; and FIGS. 4A to 4C are aberration charts showing various aberrations (spherical aberration, astigmatism, and distortion) of the single-focus lens in accordance with Example 2.

DESCRIPTION OF THE PREFERRED EMBODIMENTS

In the following, specific embodiments of the present invention will be explained with reference to the drawings.

Figure 1:
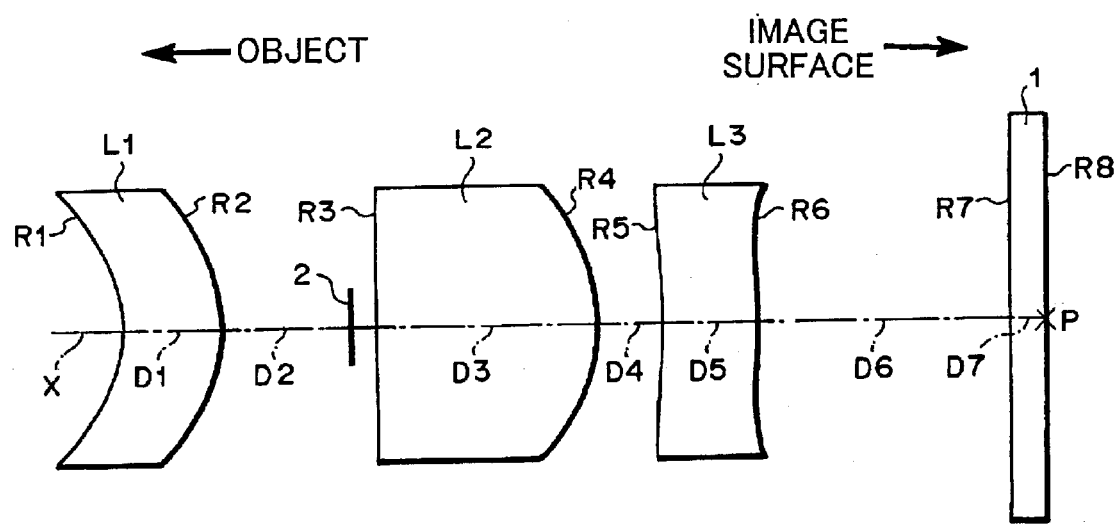
FIG. 1 is a schematic view showing the configuration of the single-focus lens in accordance with Example 1 of the present invention.

The single-focus lens of the embodiment (representing that of Example 1) shown in FIG. 1 is one comprising, successively from the object side, the first lens $L_1$ having substantially no power with a concave surface directed onto the object side, a stop 2, the second lens $L_2$ having a positive refracting power, and the third lens $L_3$ having substantially no power with a convex surface directed onto the image surface in the vicinity of the optical axis, so that a luminous flux is efficiently converged at an imaging position P on a cover glass sheet 1 of an imaging device. Here, the second lens $L_2$ has an imaging function, whereas each of the first lens $L_1$ and the third lens $L_3$ is a lens having an aberration correcting function. Namely, aberrations of the luminous flux incident on this lens system are corrected by the first lens $L_1$, the luminous flux is converged by the second lens $L_2$, and then its aberrations are corrected again by the third lens $L_3$. Since aberrations are corrected upstream and downstream the second lens $L_2$ having an imaging function, aberrations can sufficiently be made favorable by a compact, inexpensive, three-lens configuration as well.

Here, the second lens $L_2$ is a biconvex lens made of glass with a large Abbe number having a surface with a stronger curvature on the image surface side. Each of both surfaces of the first lens $L_1$ and the third lens $L_3$ is an aspherical surface represented by the following aspheric surface expression, and is configured so as to favorably correct various aberrations. A plastic material is used for the first lens $L_1$ and third lens $L_3$ in order that aspheric surfaces can be formed easily.

Aspheric surface expression $$Z=C\cdot h^2/[1+(1-K\cdot C^2\cdot h^2)^{1/2}]+A4\cdot h^4+A6\cdot h^6+A8\cdot h^8+A10\cdot h^{10}$$

where

Z is the length of the perpendicular to a tangential plane (plane perpendicular to the optical axis) of an apex of the aspheric surface from a point on the aspheric surface having a height h from the optical axis;

C (=1/R) is the reciprocal of the paraxial radius of curvature R of the aspheric surface;

h is the height from the optical axis;

K is the eccentricity; and

A4, A6, A8, and A10 are the fourth-, sixth-, eighth-, and tenth-order aspheric surface coefficients.

As mentioned above, the first lens $L_1$ and the third lens $L_3$ have substantially no power and can only function as so-called correction plates, thus yielding substantially no aberrations. Also, since they are arranged so as to hold the stop 2 therebetween, they can efficiently correct various aberrations occurring in the second lens $L_2$. Since the first lens $L_1$ and the third lens $L_3$ have substantially no power, aspheric surfaces can be designed easily.

The first lens $L_1$ has a concave surface directed onto the object side, thereby correcting aberrations more favorably.

The object-side surface of the second lens $L_2$ has a nearly flat surface in order to prevent large aberrations from occurring while keeping a power as the second lens $L_2$.

Though each of both surfaces of the first lens $L_1$ and the third lens $L_3$ is an aspheric surface, substantially favorable aberration correction can be achieved if at least one surface of each of the first lens $L_1$ and the third lens $L_3$ is provided with an aspheric surface.

Further, the single-focus lens of this embodiment is set so as to satisfy the following conditional expressions (1) to (5):

$$|f'/f_1|<0.5 \quad (1)$$

$$0.5<f'/f_2<2.0 \quad (2)$$

$$f'/f_3<0.5 \quad (3)$$

$$1.65>N_{d2} \quad (4)$$

$$50<\nu_{d2} \quad (5)$$

where f' is the focal length of the whole lens system;

$f_1$' is the focal length of the first lens;

$f_2$' is the focal length of the second lens;

$f_3$' is the focal length of the third lens;

$N_{d2}$ is the refractive index of the second lens at d-line; and $\nu_{d2}$ is the Abbe number of the second lens at d-line.

Here, the above-mentioned conditional expressions (1) to (3) define respective powers of the individual lenses. The above-mentioned conditional expressions (1) and (3) define powers of the first lens $L_1$ and the third lens $L_3$ made of a plastic material. In the outside of these numerical ranges, environmental changes such as those in temperature and humidity affect optical characteristics more strongly, which is unfavorable. On the other hand, the above-mentioned conditional expression (2) defines the power of the second lens $L_2$ having a strong power. In the outside of this numerical range, powers caused by plastic lenses of the first lens $L_1$ and the third lens $L_3$ increase, which is unfavorable in terms of aberration correction.

The above-mentioned conditional expressions (4) and (5) define characteristics of the glass material for the second lens $L_2$. In the outside of these numerical ranges, chromatic aberration is harder to correct, which is unfavorable.

EXAMPLES

In the following, examples will be explained with reference to specific numerical values.

Example 1

The single-focus lens in accordance with Example 1 is configured as explained in the embodiment.

Table 1 shows values of the radius of curvature R (mm) of each lens surface, center thickness of each lens and air space between each pair of neighboring lenses (hereinafter collectively referred to as axial surface space) D (mm), and refractive index N and Abbe number ν of each lens at d-line in this single-focus lens. The surface numbers in the table successively increase from the object side. The surfaces having "*" added to the left side of their surface numbers in Table 1 are made aspheric as mentioned above.

Table 2 shows the respective values of constants K, A4, A6, A8, and A10 of each aspheric surface shown in the above-mentioned aspheric surface expression.

The focal length f', Fno, and angle of view 2 ω are set as shown in the lower part of Table 1.

The single-focus lens of Example 1 is configured so as to satisfy all the conditional expressions (1) to (5) as shown in the lower part of Table 1.

Example 2

Figure 2:
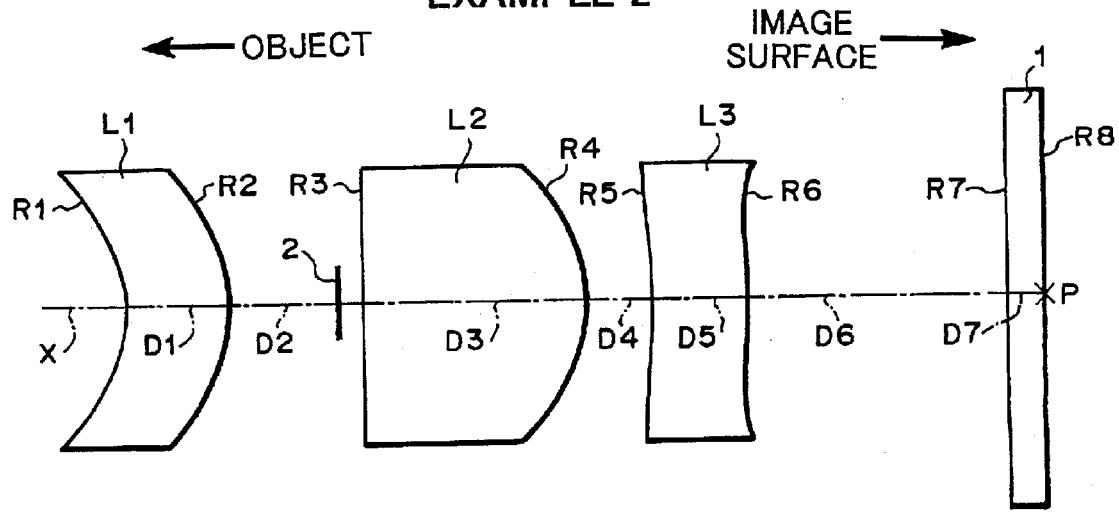
FIG. 2 is a schematic view showing the configuration of the single-focus lens in accordance with Example 2 of the present invention.

As shown in FIG. 2, the single-focus lens in accordance with Example 2 has a configuration substantially the same as that of the above-mentioned Example 1 but differs therefrom in that the object-side surface of the second lens $L_2$ is a concave surface approximating a plane.

Table 3 shows values of the radius of curvature R (mm) of each lens surface, axial surface space D (mm) of each lens, and refractive index N and Abbe number ν of each lens at d-line in this single-focus lens. The surface numbers in the table successively increase from the object side. The surfaces having "*" added to the left side of their surface numbers in Table 3 are made aspheric as mentioned above.

Table 4 shows the respective values of constants K, A4, A6, A8, and A10 of each aspheric surface shown in the above-mentioned aspheric surface expression.

The focal length f', Fno, and angle of view 2 ω are set as shown in the lower part of Table 3.

The single-focus lens of Example 2 is configured so as to satisfy all the conditional expressions (1) to (5) as shown in the lower part of Table 3.

FIGS. 3A to 3C and 4A to 4C are aberration charts showing various aberrations (spherical aberration, astigmatism, and distortion) of the single-focus lenses in accordance with the above-mentioned embodiments. Each astigmatism chart shows respective aberrations with respect to sagittal (S) and tangential (T) imaging surfaces. As can be seen from these aberration charts, the single-focus lens of each of the above-mentioned examples can favorably correct the aberrations.

The single-focus lens of the present invention is not limited to those of the above-mentioned examples. For example, the form of each lens and the form of aspheric surface can be selected as appropriate. Also, the stop may be disposed between the second and third lenses as well.

In the single-focus lens of the present invention, as explained in detail in the foregoing, a second lens having an imaging function and a stop are held between first and third lenses formed with aspheric surfaces as mentioned above while having substantially no power, whereby favorable optical performances can be attained even in a three-lens configuration which can meet requirements for compactness and lower cost.

TABLE 1

| Surface No. | R | D | $N_d$ | $v_d$ |
|---|---|---|---|---|
| *1 | −0.3891 | 0.278 | 1.58362 | 30.2 |
| *2 | −0.4371 | 0.432 | | |
| 3 | 56.8708 | 0.627 | 1.49700 | 81.6 |
| 4 | −0.5918 | 0.179 | | |
| *5 | −1.8076 | 0.269 | 1.58362 | 30.2 |
| *6 | −2.6742 | 0.695 | | |
| 7 | ∞ | 0.098 | 1.51680 | 64.2 |
| 8 | ∞ | | | |

*aspheric surface
f' = 1.00
Fno. = 5.6
2ω = 61.4°
$|f'/f_1'| = 0.190$
$f'/f_2' = 0.848$
$|f'/f_3'| = 0.093$
$N_{d2} = 1.49700$
$v_{d2} = 81.6$
Stop position: 0.361 mm from the image-surface-side surface of the first lens

TABLE 2

| | K | A4 | A6 | A8 | A10 |
|---|---|---|---|---|---|
| 1st surface | 0.0831 | 1.4356 | −2.6572 | 2.2752 | 2.6150 × 10 |
| 2nd surface | −0.1022 | 0.8857 | −1.5730 | −1.6110 × 10 | 1.1455 × 10² |
| 5th surface | −2.2030 | 1.6970 | −7.9263 | 2.4798 × 10 | −1.5844 × 10 |
| 6th surface | 0.0945 | 2.3510 | −3.1860 | 9.3429 | 2.0551 × 10 |

TABLE 3

| Surface No. | R | D | $N_d$ | $v_d$ |
|---|---|---|---|---|
| *1 | −0.3802 | 0.287 | 1.58362 | 30.2 |
| *2 | −0.4294 | 0.378 | | |
| 3 | −36.2435 | 0.634 | 1.43875 | 95.0 |
| 4 | −0.5230 | 0.181 | | |
| *5 | −1.6085 | 0.272 | 1.58362 | 30.2 |
| *6 | −2.2493 | 0.711 | | |
| 7 | ∞ | 0.100 | 1.51680 | 64.2 |
| 8 | ∞ | | | |

*aspheric surface
f' = 1.00
Fno. = 5.6
2ω = 62.0°
$|f'/f_1'| = 0.205$
$f'/f_2' = 0.833$
$|f'/f_3'| = 0.088$
$N_{d2} = 1.43875$
$v_{d2} = 95.0$
Stop position: 0.307 mm from the image-surface-side surface of the first lens

TABLE 4

| | K | A4 | A6 | A8 | A10 |
|---|---|---|---|---|---|
| 1st surface | −0.0078 | 1.3713 | −2.5627 | 1.5493 | 2.1276 × 10 |
| 2nd surface | −0.1836 | 0.8289 | −1.4870 | −1.4190 × 10 | 1.0525 × 10² |
| 5th surface | −2.1934 | 1.5808 | −7.6329 | 2.2960 × 10 | −1.0953 × 10 |
| 6th surface | 0.0942 | 2.2712 | −2.8133 | 9.0543 | 1.7471 × 10 |

What is claimed is:

1. A single-focus lens comprising, successively from an object sides, a first lens with a low power having at least one aspheric surface, a second lens with a positive refracting power having a convex form on an image surface side, and a third lens with a low power having at least one aspheric surface; and wherein a stop is disposed between said first and second lenses.

2. A single focus lens according to claim 1, wherein said first and second lenses are formed from a plastic material.

3. A single-focus lens comprising, successively from an object side, a first lens with a low power having at least one aspheric surface, a second lens with a positive refracting power having a convex form on an image surface side, and a third lens with a low power having at least one aspheric surface; and wherein said first and second lenses are formed from a plastic material.

4. A single-focus lens comprising, successively from an object side, a first lens with a low power having at least one aspheric surface, a second lens with a positive refracting power having a convex form on an image surface side, and a third lens with a low power having at least one aspheric surface; and wherein said single-focus lens satisfies the following conditional expressions (1) to (3):

$|f'/f_1'| < 0.5$     (1)

$0.5 < f'/f_2' < 2.0$     (2)

$|f'/f_3'| < 0.5$     (3)

where
f' is the focal length of the whole lens system;
$f'_1$ is the focal length of the first lens;
$f'_1$ is the focal length of the second lens; and
$f'_3$ is the focal length of the third lens.

5. A single-focus lens according to comprising, successively from an object side, a first lens with a low power having at least one aspheric surface, a second lens with a positive refracting power having a convex form on an image surface side, and a third lens with a low power having at least one aspheric surface; and wherein said single-focus lens satisfies the following conditional expressions (4) and (5):

$1.65 > N_{d2}$     (4)

$50 < v_{d2}$     (5)

where
$N_{d2}$ is the refractive index of the second lens at d-line; and
$V_{d2}$ is the Abbe number of the second lens at d-line.

6. A single-focus lens comprising, successively from an object side, a first lens with a low power having at least one aspheric surface, a second lens with a positive refracting power having a convex form on an image surface side, and a third lens with a low power having at least one aspheric surface; and
wherein said second lens has a substantially flat surface on the object side.

* * * * *

UNITED STATES PATENT AND TRADEMARK OFFICE
CERTIFICATE OF CORRECTION

PATENT NO. : 6,775,072 B2
DATED : August 10, 2004
INVENTOR(S) : Kenichi Sato

It is certified that error appears in the above-identified patent and that said Letters Patent is hereby corrected as shown below:

Column 6,
Line 12, delete "sides" and substitute therefore -- side --
Line 20, delete "single focus" and substitute therefore -- single-focus --
Line 40, delete "$|f´/f_1´|<0.5$" and substitute therefore -- $|f´/f´_1|<0.5$ --
Line 41, delete "$0.5<f´/f_2´<2.0$" and substitute therefore -- $0.5<f´/f´_2<2.0$ --
Line 42, delete "$|f´/f_3´<0.5$" and substitute therefore -- $|f´/f´_3<0.5$ --
Line 48, delete "$f´_1$" and substitute therefore -- $f´_2$ --
Line 50, delete "according to"
Line 65, delete "$V_{d2}$" and substitute therefore -- $\upsilon_{d2}$ --

Signed and Sealed this

First Day of February, 2005

JON W. DUDAS
*Director of the United States Patent and Trademark Office*